United States Patent [19]

House et al.

[11] Patent Number: 4,578,446

[45] Date of Patent: Mar. 25, 1986

[54] SECONDARY AROMATIC DIAMINES AS CURING AGENTS IN POLYURETHANE MANUFACTURING

[75] Inventors: David W. House, Arlington Heights; Ray V. Scott, Jr., Addison, both of Ill.

[73] Assignee: UOP Inc., Des Plaines, Ill.

[21] Appl. No.: 715,719

[22] Filed: Mar. 25, 1985

[51] Int. Cl.$^4$ .................. C08G 18/32; C08G 18/16
[52] U.S. Cl. ........................... 528/64; 528/48
[58] Field of Search ............................. 528/64

[56] References Cited

U.S. PATENT DOCUMENTS 3,194,793  7/1965  Kogon ........................ 528/63
3,846,351  11/1974 Huffaker et al. ............. 260/2.5 AM Primary Examiner—Herbert S. Cockeran
Attorney, Agent, or Firm—Thomas K. McBride; William H. Page, II; Eugene I. Snyder

[57] ABSTRACT

Polyurethanes may be conveniently made by curing isocyanate-terminated urethane prepolymers with a N,N'-dialkylmethylenedianiline. The diamine N,N'-di(2-butyl)-4,4'-methylenedianiline is a particularly useful diamine. The resulting polyurethanes often are thermoplastic rather than thermosetting, making them especially useful as coatings, adhesives, and sealants. Such secondary aromatic diamines have acceptable pot lives and afford products with a variety of properties.

20 Claims, No Drawings

SECONDARY AROMATIC DIAMINES AS CURING AGENTS IN POLYURETHANE MANUFACTURING

BACKGROUND OF THE INVENTION

As a subclass of commercially available polymers, polyurethane elastomers have several properties whose advantages confer unique benefits on these products. Typically, polyurethanes show high abrasion resistance with high load bearing, excellent cut and tear and resistance, high hardness, resistance to ozone degradation, yet are pourable and castable. Compared to metals, polyurethanes are lighter in weight, less noisy in use, and show better wear and excellent corrosion resistance while being capable of cheap fabrication. Compared to other plastics, polyurethanes are non-brittle, much more resistant to abrasion, and exhibit good elastomeric memory. Polyurethanes find use in such diverse products as aircraft hitches, bushings, cams, gaskets, gravure rolls, star wheels, washers, scraper blades, impellers, gears, and drive wheels.

Part of the utility of polyurethanes derives from the enormous diversity of properties in products which can result from a relatively limited number of reactants. Typically, polyurethanes are prepared on site by curing a urethane prepolymer, which are adducts of polyisocyanates and polyhydric alcohols. A large class of such prepolymers are approximately 2:1 adducts of a diisocyanate, OCN—Y—NCO, and a diol, HO—Z—OH, whose resulting structure is OCN—Y—NH—CO$_2$—Z—O$_2$CNH—Y—NCO. Although Y is susceptible of great variety, usually being a divalent alkyl, cyclohexyl, or aromatic radical, in fact the most available prepolymers are made from toluene-2,4-diisocyanate (TDI) or methylene-4,4'-diphenylisocyanate (MDI). The diols used display a greater range of variety; Z may be a divalent alkyl radical (i.e., an alkylene group), and the diols frequently are ethers or esters which are the condensation products of glycols with alkylene oxides or dicarboxylic acids, resp. The polyurethane elatomers are formed by curing the prepolymer.

Curing involves the reaction of the terminal isocyanate groups of the prepolymer with active hydrogens of a polyfunctional compound so as to form high polymers through chain extension and, in some cases, crosslinking. Diols, especially alkylenediols, are the most common curing agents for MDI-based prepolymers, and where such diols have the structure HO—X—OH, where X is an organic moiety, most usually an alkylene group, the resulting polymer has as its repeating unit,

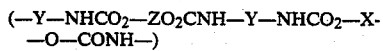

Where a triol or a higher polyhydric alcohol is used crosslinking occurs to afford a nonlinear polymer.

Although other polyfunctional chemicals, especially diamines, are theoretically suitable, but with a few exceptions none have achieved commercial importance as a curing agent. The major exception is 4,4'-methylene di-orthochloroaniline, usually referred to as MOCA, a curing agent which is both a chain extender and a cross linker. TDI-based prepolymers typically are cured with MOCA, and the resulting products account for perhaps most of the polyurethane elastomer market. One reason that polyhydric alcohols generally have gained acceptance as curing agents is that their reaction with urethane prepolymers is sufficiently fast to be convenient, but not so fast as to make it difficult to work with the resulting polymer. In casting polymers it is desirable that the set-up time be reasonably short, yet long enough for the material to be cast into molds. This property is conventionally referred to as pot life. Generally speaking, diamines react with prepolymers, and especially MDI-based prepolymers, so quickly that they are not usable as curing agents. However, primary aromatic diamines with electronegative groups on the aromatic ring, or with alkyl groups ortho to the amino moiety, exhibit sufficiently decreased reactivities with some prepolymers as to afford a desirable pot life, hence the use of, for example, MOCA as a curing agent for TDI-based prepolymers. However, MOCA and other of the aforementioned diamines still remain too reactive to be used, for example, with MDI-based prepolymers.

Previously only primary aromatic diamines seem to have been investigated as curing agents. Presumably this is because secondary diamines were expected to have an unacceptably long pot life, and because they could act only as chain extenders in contrast to the crosslinking capabilities of primary diamines. It was then quite surprising and unexpected to find that the secondary aromatic diamines of this invention gave an acceptable pot life with a variety of urethane prepolymers. By way of definition, for the purpose of this application, a chain extender is a curing agent which increases the length of individual chains, and a cross linker is a curing agent which links two individual chains. Thermoplastic properties usually are associated with chain extension, and rigidity and compression set are properties associated with crosslinking.

U.S. Pat. No. 3,846,351 describes the quite narrow use of secondary aromatic alkyl diamines in combination with polyols as catalysts and chain extenders in the production of flexible polyurethane foams. It is important to recognize that such secondary diamines were used only in combination with polyols, preferably at the relatively low level of 0.5–5 parts per 100 parts of polyol. In an examination of aromatic diamines as chain extenders in polyurethane elastomers by reaction injection molding, the sole secondary aromatic diamine examined, N,N'-diisopropyl-4,4'-methylenedianiline, afforded products whose properties were generally unacceptably inferior to those exhibited by polyurethanes made with primary aromatic diamines as curing agents. "D. Nissen and R. A. Markovs," Proceedings of the 27th SPI Annual Technical/Marketing conference, 71-8. Consequently, it seems fair to say that the prior use of secondary aromatic diamines as a curing agent in polyurethane manufacture is quite limited in scope and generally unfavorable in results.

Therefore, it was particularly surprising to find that certain N,N'-dialkyl-4,4'-methylenedianilines are generally effective curing agents for a broad range of urethane prepolymers. The resulting polyurethanes often have the advantage of being thermoplastic rather than thermosetting, thereby making them especially useful as coatings, adhesives, and sealants. The secondary aromatic diamines of this invention have commercially acceptable pot lives as curing agents for many prepolymers, and afford products with an impressive variety of properties.

SUMMARY OF THE INVENTION

The object of this invention is to prepare polyurethanes using secondary aromatic alkyl diamines as curing agents. In an embodiment the curing agent is an N,N'-dialkyl methylenedianiline, where the alkyl group contains from 4 to about 20 carbon atoms. In a more specific embodiment, the diamine is a 4,4'-methylene dianiline. In a still more specific embodiment, the curing agent is N,N'-di-(2-butyl)-4,4'-methylenedianiline. Other objects and embodiments will become obvious from the description which follows.

DESCRIPTION OF THE INVENTION

In one aspect the invention herein is a method of making polyurethanes by curing a diisocyanate-terminated urethane prepolymer with a secondary aromatic alkyl diamine. In another aspect the invention is the polyurethane resulting from reactions of such isocyanate-terminated urethane prepolymers with the aforementioned secondary aromatic alkyl diamine.

The urethane prepolymers used in the practice of this invention are isocyanate-terminated adducts of a polyisocyanate and polyhydric alcohols. Prepolymers which are adducts of diisocyanates and dihydric alcohols, or diols, are the most commonly used prepolymers in commerce today and will be used to exemplify and illustrate urethane prepolymers generally. However, it is to be clearly understood that this invention is applicable to urethane prepolymers generally, and should not be restricted to those prepolymers arising from diisocyanates and diols. As examples of such polyisocyanates may be cited the toluene diisocyanates, m-phenylene diisocyanate, tetramethylene diisocyanate, 1,6-hexamethylene diisocyanate, 1,4-cyclohexylene diisocyanate, 4,4'-methylene-dicyclohexylisocyanate, 4,4'-methylenediphenylisocyanate, 3,3'-dimethyl-4,4'-diphenylmethane diisocyanate, and 1,5-tetrahydronaphthalene diisocyanate. As stated previously, TDI and MDI are currently the preferred diisocyanates in urethane prepolymers.

Among the diols frequently used in making urethane prepolymers are alkylene diols, such as ethyleneglycol, 1,3-propylenediol, 1,4-butylenediol, and so forth. Diolethers and diolesters find widespread use in making urethane prepolymers. The diolethers, as exemplified by poly(alkyleneoxy)diols, are typically condensation products of alkyleneoxides with glycols or water, with the number of alkyleneoxy groups in the molecule generally increasing as the ratio of oxide to glycol increases. Examples of glycols include ethyleneglycol, propyleneglycol and butyleneglycol, and exemplary of the alkylene oxides are ethylene oxide, propylene oxide, butylene oxide, amylene oxide, and tetrohydrofuran. The diolesters often are esters of dicarboxylic acids and diols, especially the glycols previously exemplified. Most typically, such products are esters of linear or aromatic dicarboxylic acids, such as succinic, glutaric, adipic, pimelic, suberic, azelaic, sebacic, phthalic, terephthalic, isophthalic acids, and so on. But it needs to be stressed again that the structures cited above are merely illustrative and exemplary of the diisocyanates and diols which may be used in making a urethane prepolymer, and are not intended to be exhaustive.

The ratio of reactants used in preparing the prepolymer is generally expressed in terms of relative numbers of isocyanate and hydroxyl groups, respectively. In this context, an equivalent amount of isocyanate and diol contains an equal number of isocyanate and hydroxyl groups. The prepolymer may contain from about 1.5 to about 4.0 equivalents of diisocyanate relative to diol, but most commonly there are about 2 equivalents diisocyanate per diol.

The polyurethane elastomer is made by reacting the prepolymer with a secondary aromatic alkyl diamine of the structure.

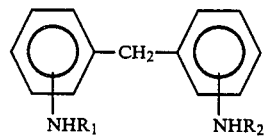

Each alkyl group, R, contains from 4 up to about 20 carbon atoms. Alkyl groups containing from 4 to about 10 carbon atoms, and especially from 4 to about 8 carbon atoms, are particularly preferred. The alkyl group may be a primary, secondary, or tertiary alkyl group, although when the alkyl is tertiary there is the risk that cure time may be too long to be commercially acceptable. Secondary alkyl groups are preferred, and among these the secondary butyl group is particularly preferred. Of the positional isomers possible the 4,4'-methylenedianilines are most desirable.

Defining an equivalent of diamine as an amount which furnishes as many amino groups as there are isocyanate groups in the urethane prepolymer, from about 0.80 to about 1.2 equivalents of diamine are used in curing, with the range from about 0.85 to about 1.1 being the more usual one. Since each amino group has only one hydrogen, such secondary amines act only as a chain extender and not as a cross linker. On the other hand, the curing mix may contain other materials, including cross linkers such as polyols, in addition to, or partly replacing, the diamines of this invention. Where a crosslinking agent is present it typically will replace from about 5 to about 25 percent of the diamine. It is to be understood that such a curing mixture is contemplated as being within the scope of this invention.

The initial reaction between the urethane prepolymer and the diamine is conducted at a temperature between about 75° and about 120° C. The temperature is chosen, in part, in order to afford a convenient pot life, that is, the time interval from mixing the diamine and urethane prepolymer until the mixture is very difficult to pour. The elastomer is then cured to a tack-free state by heating at the same temperature range for an additional period from about 2 to about 24 hours.

The following examples are merely illustrative of this invention which is not to be limited thereto. In particular, the use of N,N'-di(2-butyl)-4,4'-methylene dianiline is to be construed only as representative of the diamines of this invention.

EXAMPLE 1

Preparation of polyurethane elastomer. The prepolymer was heated to mixing temperature and then degassed using vacuum at 0.5 torr. The degassed prepolymer was reheated to mixing temperature and the curing agent, which was independently heated to mixing temperature, was quickly added. The mixture was stirred carefully to minimize incorporation of bubbles and could be degassed a second time if the pot lift permitted. Once mixed, the polymer was cast onto a preheated steel plate treated with a Teflon-based mold release agent and the plate placed in an oven at curing temperature. The pot lift was determined as that amount of time the polymer mixture remained flowing at mixing temperatures. The tack-free point, determined at room temperature, represented the time where a glass rod no longer stuck to the polymer surface and a paper towel could be pressed against the surface and pulled away without leaving any lint.

Hardness of polyurethanes was measured using a durometer according to ASTM Method D 2240. Tear resistance was measured using Die C according to ASTM Method D 624. Stress-elongation measurements were made according to ASTM Method D 412, Die C. Compression set was measured according to ASTM Method D 395, Method B.

Properties of polyurethanes prepared using the diamines of this invention and some other, commercially used curing agents are summarized in Table 1.

EXAMPLE 2

Polyurethanes were made by curing various prepolymers with a mixture of N,N'-di(2-butyl)-4,4'-methylenedianiline and trimethylol propane, a cross-linking agent, at 100° for 17 hours. Results are summarized in the following table.

TABLE 2
TRIMETHYLOL PROPANE CROSSLINKED POLYURETHANES

| Prepolymer | Equivalents Diamine Used | Weight % Triol in Curing Mix | Hardness Shore A | Tensile Strength, psi | Compression Set, % |
|---|---|---|---|---|---|
| Conathane 1511 | .90 | 0 | 60 | 2,061 | 87 |
|  | .90 | 10 | 65 | 2,659 | 58 |
|  | .90 | 20 | 68 | 3,249 | 60 |
|  | .85 | 0 | 63 | 2,450 | 86 |
|  | .85 | 10 | 69 | 3,105 | 59 |
| Cyanaprene A9 | .95 | 0 | 61 | 3,209 | 99 |
|  | .95 | 10 | 62 | 2,448 | 96 |
|  | .95 | 20 | 57 | 3,475 | 60 |

TABLE 1
PROPERTIES OF POLYURETHANES

| Prepolymer | Conathane RN 1501[a] | | Conathane RN 1511[b] | | Cyanaprene A9[c] | | Cyanaprene D7[d] | |
|---|---|---|---|---|---|---|---|---|
| Curing Agent[h] | MOCA | U | M | U | M | U | M | U |
| Pot life, minutes (°C.) | 15(100) | 15–19(100) | 4(100) | 22(100) | 6–8(100) | 16(100) | 5(100) | 9(100) |
| Cure time, hours (°C.) | 2(100) | 17(100) | 2(100) | 17(100) | 17(100) | 17(100) | 17(100) | 17(100) |
| Hardness | | | | | | | | |
| Shore A | 91 | 62 | 95 | 63 | 91 | 57 | 98 | 96 |
| Shore D | 43 | 15 | 53 | 16 | 42 | 12 | 73 | 62 |
| Tear Resistance, lbs/in | 275 | 113 | 281 | 117 | 453 | 463 | 1,127 | 507 |
| Stress at % Elongation, lbs/in$^2$ | | | | | | | | |
| 100 | 923 | 220 | 1,932 | 258 | 1,201 | 190 | 4,758 | 1,305 |
| 200 | 1,338 | 288 | 3,348 | 368 | 1,581 | 241 | — | 1,916 |
| 300 | 2,094 | 380 | — | 619 | 2,352 | 276 | — | 3,158 |
| Rupture | | | | | | | | |
| Stress | 4,125 | 1,857 | 3,781 | 2,180 | 3,500 | 3,209 | 5,164 | 3,402 |
| % Elongation | 358 | 535 | 242 | 408 | 400 | 760 | 146 | 317 |
| Compression Set (70° C.) | 23 | 90 | 20 | 80 | 22 | 97 | 31 | 90 |

| Prepolymer | Multrathane E516[e] | | Vibrathane 8021[f] | | Vibrathane 8022[g] | |
|---|---|---|---|---|---|---|
| Curing Agent[h] | B | U | B | U | B | U |
| Pot life, minutes (°C.) | 5(80) | 0.5–1(80) | — | 0.5–2(93) | 6(93) | 1(93) |
| Cure time, hours (°C.) | 10(80) | 10(80) | 4(115) | 17(100) | 4(115) | 3(115) |
| Hardness | | | | | | |
| Shore A | 89 | 98 | 84 | 99 | 95 | 96 |
| Shore D | 36 | 67 | 35 | 63 | 52 | 70 |
| Tear Resistance, lbs/in | 307 | 524 | 413 | 427 | 474 | 784 |
| Stress at % Elongation, lbs/in$^2$ | | | | | | |
| 100 | 1,232 | 1,709 | 814 | 2,032 | 1,635 | 2,454 |
| 200 | 1,854 | 2,535 | 1,095 | 3,249 | — | 2,997 |
| 300 | 2,499 | 4,603 | 1,494 | 5,579 | 2,557 | — |
| Rupture | | | | | | |
| Stress | 2,429 | 4,575 | 2,456 | 5,574 | 2,360 | 3,087 |
| % Elongation | 288 | 317 | 433 | 284 | 267 | 183 |
| Compression Set (70° C.) | 17 | 98 | 41 | 55 | 50 | 93 |

[a] A TDI-ether from Conap, 4.25% isocyanate groups.
[b] A TDI-ether from Conap, 6.25% isocyanate groups.
[c] A TDI-ester from American Cyanamid, 4.2% isocyanate groups.
[d] A TDI-ester from American Cyanamid, 7.0% isocyanate groups.
[e] An MDI-ether from Mobay, 8.87% isocyanate groups.
[f] An MDI-ester from Uniroyal, 6.76% isocyanate groups.
[g] An MDI-ester from Uniroyal, 9.38% isocyanate groups.
[h] M = MOCA; U = N,N'—di(2-butyl)-4,4'-methylene dianiline; B = 1,4-butanediol.
All curing agents were used at a stoichiometry of 0.90 equivalents for Conathane, and 0.95 equivalents for the other prepolymers.

TABLE 2-continued

TRIMETHYLOL PROPANE CROSSLINKED POLY-
URETHANES

| Prepolymer | Equivalents Diamine Used | Weight % Triol in Curing Mix | Hardness Shore A | Tensile Strength, psi | Compression Set, % |
|---|---|---|---|---|---|
|  | .85 | 0 | 59 | 3,959 | 93 |
|  | .85 | 10 | 59 | 3,885 | 72 |
| Mobay | .95 | 0 | 65$^a$ | 5,450 | 93 |
| E516 | .95 | 10 | 63$^a$ | 4,430 | 81 |
|  | .95 | 20 | 68$^a$ | 4,758 | 68 |

$^a$Hardness values are on the Shore D scale.

EXAMPLE 3

Pot life can be significantly decreased by the addition of catalysts. This example shows the effect of 5% oleic acid in the pot life where various prepolymers were cured with the diamine of the prior example. Values of pot life in parenthesis are those in the absence of catalyst.

TABLE 3

EFFECT OF 5% OLEIC ACID IN CURING MIX ON POT LIFE

| Prepolymer | Equivalents Curing Agent | Pot Life at 100° C., in Minutes |
|---|---|---|
| Curathane 1501 | .90 | 11(19) |
| Curathane 1511 | .90 | 4(22) |
| Cyanaprene A9 | .95 | 1(16) |

What is claimed is:

1. A polyurethane resulting from the reaction of an isocyanate terminated urethane prepolymer, said prepolymer being the adduct of from about 1.5 to about 4.0 equivalents of a polyisocyanate with one equivalent of a polyol, with from about 0.80 to about 1.2 equivalent of a secondary aromatic diamine of the structure,

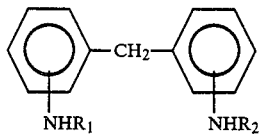

where each alkyl group, $R_1$ and $R_2$, contains from 4 to about 20 carbon atoms.

2. The polyurethane of claim 1 where the prepolymer is an adduct of a diisocyanate and a dihydric alcohol.

3. The polyurethane of claim 2 where the diisocyanate is toluene diisocyanate or methylenediphenylisocyanate.

4. The polyurethane of claim 1 where the alkyl group contains from 4 to about 10 carbon atoms.

5. The polyurethane of claim 4 where the alkyl group contains from 4 to 8 carbon atoms.

6. The polyurethane of claim 1 where the alkyl is a secondary alkyl moiety.

7. The polyurethane of claim 1 where the alkyl group is the 2-butyl group.

8. The polyurethane of claim 1 where the diamine is a N,N'-dialkylmethylene-4,4'-dianiline.

9. The polyurethane of claim 8 where the diamine is N,N'-di(2-butyl)methylene-4,4'-dianiline.

10. The polyurethane of claim 1 where from about 5 to about 25 percent of the diamine is replaced by a crosslinking agent.

11. A method of curing a polyurethane prepolymer comprising reacting an isocyanate terminated urethane prepolymer, said prepolymer being the adduct of from about 1.5 to about 4.0 equivalents of a polyisocyanate with one equivalent of a polyol, with from about 0.80 to about 1.2 equivalent of a secondary aromatic diamine of the structure,

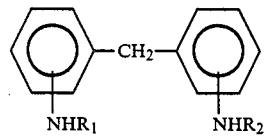

where each alkyl group, $R_1$ and $R_2$, contains from 4 to about 20 carbon atoms, at a temperature between about 75° C. and about 120° C., and recovering the cured polyurethane resulting therefrom.

12. The method of claim 11 where the prepolymer is an adduct of a diisocyanate and a dihydric alcohol.

13. The method of claim 12 where the diisocyanate is toluene diisocyanate or methylenediphenylisocyanate.

14. The method of claim 11 where the alkyl group contains from 4 to about 10 carbon atoms.

15. The method of claim 14 where the alkyl group contains from 4 to 8 carbon atoms.

16. The method of claim 11 where the alkyl is a secondary alkyl moiety.

17. The method of claim 11 where the alkyl group is the 2-butyl group.

18. The method of claim 11 where the diamine is a N,N'-dialkylmethylene-4,4'-dianiline.

19. The method of claim 18 where the diamine is N,N'-di(2-butyl)-methylene-4,4'-dianiline.

20. The polyurethane of claim 11 where from about 5 to about 25 percent of the diamine is replaced by a crosslinking agent.

* * * * *